United States Patent Office 3,660,341
Patented May 2, 1972

---

3,660,341
HEAT STABLE POLYURETHANE SOLUTIONS
Kornelius Dinbergs, North Royalton, Ohio, assignor to
The B. F. Goodrich Company, New York, N.Y.
No Drawing. Filed Nov. 3, 1969, Ser. No. 873,514
Int. Cl. C08g *51/44, 51/58*
U.S. Cl. 260—32.6 N      5 Claims

ABSTRACT OF THE DISCLOSURE

Solutions of polyurethane are stabilized by the addition of an organic halogen-containing compound such as ethyl iodide. These stabilized solutions are protected against severe degradation on aging, even at high temperatures.

BACKGROUND OF THE INVENTION

Solid polyurethane elastomers which include the reaction products of (1) hydroxyl terminated polyesters, hydroxy (polyalkylene oxide)s, hydroxy polyacetals and the like, and (2) a free glycol chain extender with (3) an organic diisocyanate, such as those described in U.S. Pats. 2,871,218 and 2,899,411 are known. But there are many situations in which polyurethane solutions are needed. Polyurethane solutions are employed in the manufacture of films, coatings, and adhesives. Solutions of the polymers described in the patents cited above can be prepared by dissolving the solid melt polymers in a solvent therefor or by employing solution polymerization techniques. Many of these polyurethanes solutions must be used within a relatively short time after preparation since they degrade quite readily on storage. It woud be desirable to have stabilized polyurethane solutions which have good storage life even at relatively high temperatures.

SUMMARY OF THE INVENTION

Heat stable polyurethane solutions can be prepared by the addition of minor amounts of an organic halogen-containing stabilizing compound to the polyurethane solution. The stabilized polyurethane solutions formed can be stored for extended periods of time; being protected against severe degradation, even at high temperatures. A similar polyurethane solution which is not stabilized will degrade quite readily when subjected to identical storage conditions. When 0.33% by weight, based on the weight of polymer in the solution, of ethyl iodide was added to one of two similar polyurethane solutions, and the solutions aged for 72 hours at 65° C., the ethyl iodide treated polymer solution retained 78.1% of its original Brookfield viscosity while the control solution retained only 9.5%. The stabilized compositions of this invention comprise (A) a polyurethane elastomer, (B) an organic solvent and (C) a halogen-containing organic compound. About 0.003 to 3.0 weight percent, based on the total weight of polymer in the solution, of an organic halogen-substituted aliphatic hydro-carbon compound is an effective stabilizer.

In addition to their superior stabilizing ability, the organic halogen-containing compounds of this invention have no detrimental effect on the physical properties of the recovered polyurethanes on aging.

DETAILED DESCRIPTION OF THE INVENTION

The polyurethane solutions used in this invention comprise (A) any polyurethane dissolved in (B) an organic solvent. The invention is particularly applicable to elastomers prepared by reacting (1) a hydroxy terminated polyester, a hydroxyl poly(alkylene oxide) a hydroxyl polyacetal and the like, and (2) a free glycol chain extended with (3) an organic diisocyanate.

Reactant (1) of the polyurethanes employed in the practice of this invention includes hydroxy terminated polyesters, hydroxyl poly(alkylene oxide)s, hydroxyl polyacetals and the like. These polymers have an essentially linear structure and a molecular weight range from about 500 to 5,000, and preferably between 750 and 3,500.

The basic hydroxy terminated polyesters utilized are prepared by the esterification of a dicarboxylic acid such as adipic, succinic, and the like or their anhydrides, and an aliphatic glycol such as ethylene glycol, propanediol, 1,4-butanediol, and the like. Preferred acids are those dicarboxylic acids of the formula

HOOC—R—COOH where R is an alkylene radical containing 2 to 8 carbon atoms. Preferred glycols are those of the formula

HO(CH$_2$)$_x$OH wherein $x$ is 4 to 8. Molar ratios of more than 1 mole of glycol to acid are preferred so as to insure linear chains containing a preponderance of terminal hydroxyl groups.

The hydroxyl (polyalkylene oxide)s, or polyethers, are essentially linear hydroxy-terminated compounds having ether linkages as the major linkage joining carbon atoms, such as those polyethers prepared by the cleavage of a cyclic ether with a Lewis acid. They have the formula

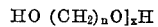

HO(CH$_2$)$_n$O]$_x$H wherein $n$ is a number from 2 to 6 and $x$ is an integer.

The polyacetals are generally prepared by the reaction of an aldehyde and a polyhydric alcohol with an excess of the alcohol, including for example, the reaction products of aldehydes such as formaldehyde, and the like, reacted with glycols, such as ethylene glycol, and the like, which are well known to those skilled in the art.

The molar ratio of the reactants is maintained so that the reaction product has essentially no free hydroxyl or isocyanate groups. About 1 mole of reactant (1) is reacted with from about 0 to 15, preferably from 0.1 to 10 moles of free glycol reactant (2) and the amount of diisocyanate (3) is varied from about 1.0 to 16 moles, preferably from 1.1 to 11 moles, preferably in ratios so that the number of equivalents of isocyanate will essentially balance the available equivalents of hydroxyl. If a solution polymerization is used, there is usually a small amount of water, present in the solvent which reacts with the isocyanate groups and creates an unbalanced system. To compensate for this, a slight molar excess of diisocyanate should be charged initially so that the critical molar balance is maintained.

The free glycol chain extender, polymeric reactant and organic diisocyanate components may be admixed directly if they are in the liquid state, melt mixed if both or either of them are solids, or added to a solvent for subsequent solution polymerization. Although any free glycol can be used, typical free glycol compounds are aliphatic glycols, such as ethylene glycol, 1,4-butanediol, and the like; the cycloaliphatic glycols, and glycols containing an aryl group.

Typical diisocyanate compounds employed are the aliphatic diisocyanates, such as tetramethylene diisocyanate, hexamethylene diisocyanate and the like; the cycloaliphatic diisocyanates, such as cyclohexyl diisocyanate and the like; the aromatic diisocyanates, such as the phenyl diisocyanates, the toluene diisocyanates and the like; the dicycloaliphatic diisocyanates, such as dicyclohexyl methane diisocyanate and the like; and the diaryl diisocyanates, such as diphenyl methane diisocyanate, diphenyl methane-p,p'-diisocyanate, dichloro-diphenyl methane diisocyanate, dimethyl diphenyl methane diisocyanate, diphenyl dimethyl methane diisocyanate, dibenzyl diisocyanate, d*phenyl ether diisocyanate and the like.

The solvents (B) used in preparing the polyurethane solutions of this invention are selected from a wide range of organic solvents capable of dissolving the aforementioned urethane polymers so as to form gel free solutions. Preferred are the ketones, such as acetone, methyl ethyl ketone and the like; cyclic ethers, such as tetrahydrofuran, dioxane and the like; substituted amides, such as dimethyl formamide, N,N'-dimethyl acetamide and the like; sulfoxides and sulfones, such as dimethyl sulfoxide, dimethyl sulfones and the like; cyclic ketones, such as cyclopentanone, cyclohexanone and the like; or combinations of the above solvents.

Any known urethane polymerization technique may be used to chemically combine the reactants. However, the preferred methods are either solution or bulk polymerization. If a bulk polymerization method, such as that described in U.S. Pats. 2,871,218 or 2,899,411 is employed, the elastomer (A) is added to the solvent (B) after polymerization. This solvent addition step is unnecessary when a solution polymerization technique is employed.

Solution polymerizations can be carried out in a catalytic or non-catalytic system. Typical catalysts for these polymerizations are the tertiary amines such as triethylenediamine and the like; metal salts such as potassium acetate, and the like; amine salts, such as dimethylbenzylamine lactate and the like; non-basic inorganic metal compounds such as ferric chloride, and the like; metal carboxylates, such as the stannous carboxylates and the like; alkali alcoholates such as sodium ethoxide and the like; and alkali phenolates, such as sodium phenoxide and the like. The solution polymerization reaction may be short-stopped by adding a mono-functional alcohol. Although these polymers are valuable when used as is, compounding materials such as carbon black silica, lignin, coloring agents, antioxidants, plasticizers, fillers and the like, may be added if desired.

In addition to their superior stabilizing ability, the organic halogen-containing compounds of this invention have no detrimental effect on the physical properties of the recovered polyurethanes on aging. For example, a recovered urethane polymer to which ethyl iodide had been added performed as well as a control polymer when the physical properties of each of these materials were compared. The unstabilized polymer solutions, regardless of the means used to prepare them, normally comprise from about 10 to 40% by weight, preferably from 15 to 35% by weight, based on the weight of the total solution employed, of (A) a polyurethane elastomer dissolved in (B) an organic solvent. The degree of degradation protection imparted to a polyurethane solution by the addition of a small amount of stabilizing compounds of this invention is determined by comparing the original and aged Brookfield viscosities by applying the formula:

Percent retention $$= \frac{\text{Brookfield viscosity of the aged polymer solution}}{\text{Initial Brookfield Viscosity}} \times 100$$

Unstabilized polyurethane solutions degrade quite readily on storage. For example, a solution polymerized polyesterurethane, prepared by the reaction of poly(tetramethylene adipate) glycol, 1,4-butanediol and diphenyl methane-4,4'-diisocyanate in dimethyl formamide, had a percent retention of only 9.5% after aging for 72 hours at 65° C. When the stabilizing agents of this invention are added, unexpected degradation protection is imparted to the polymer solution. Up to 10 times greater percent retention has been shown by the stabilized solution than by the control. About 0.003 to 3.0 wt. percent, preferably 0.01 to 2.0 wt. percent based on the total weight of polymer in the solution, of an organic halogen-containing stabilizing compound is added. The halogen-containing stabilizers of this invention have the structure

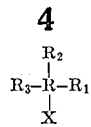

wherein R is a saturated aliphatic hydrocarbon chain containing from 1 to 6 carbon atoms; or an aliphatic hydrocarbon chain containing 2 to 6 carbon atoms and having a terminal double bond. $R_1$, $R_2$ and $R_3$ are hydrogen, halogen or an alkyl group containing from 1 to 4 carbon atoms, and X is halogen selected from the group consisting of chlorine, bromine and iodine. The preferred halogen-containing stabilizing compounds are the alkyl halides, such as methyl bromide, methyl iodide, ethyl bromide, ethyl iodide, n-propyl bromide, n-propyl iodide, n - butyl bromide, 2 - bromobutane, 2 - bromo-2-methyl butane, 2-chloro-2-methyl-butane and the like; the allyl halides, such as allyl bromide, allyl chloride, allyl iodide, methallyl chloride, methallyl bromide, methallyl iodide and the like; the alkyl dihalides, such as 1-chloro-2-bromoethane, 1-chloro-2-bromopropane, 1,3-di-bromopropane, 1-bromo-3-chloropropane, 1,4-dibromobutane and the like; the alkyl trihalides, such as ethylene tribromide, 1,2,3-tribromopropane and the like; and tetrahalides, such as carbon tetrabromide and the like.

The stabilizing solutions of this invention are useful in forming long lasting, environment resisting films which can be deposited on a substrate.

In addition, adhesive coatings having high bonding strengths are prepared, as well as superior coatings for wire and cable.

Example I

A solution polymerization was conducted in about 668 grams of dimethyl formamide by reacting 0.1174 mole of poly(tetramethylene adipate) glycol, molecular weight 2044, hydroxyl number 52.5, acid number 1.2, and 0.0352 mole of 1,4-butanediol, with 0.1585 mole of diphenyl methane-4,4'-diisocyanate under nitrogen at 85° C. for 255 minutes. About 4.7 ml. of normal propanol was added to shortstop the reaction. Ethyl iodide, 0.33 weight percent based on the weight of polymer in the polyurethane solution, was added to one of two jars each containing 180 grams of the 30.3% total solids polymer cement. After measuring the initial Brookfield viscosity at 65° C., the solutions were heated in an oven at 65° C. for 72 hours and a final Brookfield viscosity was determined. The initial viscosity of the control was 29,600 cps., the final viscosity was 10,400 cps., and the percent retention was 35%. The solution containing ethyl iodide retained 91% of its original Brookfield viscosity. A minor amount of ethyl iodide is an effective stabilizer for polyurethane solutions.

Example II

Using the procedure outlined in Example I, the following polymerization recipe was employed:

|  | Mol |
|---|---|
| Poly(tetramethylene adipate) glycol molecular weight=950; OH#=112.9; acid #2.6) | 0.1895 |
| 1,4-butanediol | 0.3790 |
| Diphenyl methane-4,4'-diisocyanate | 0.5779 |
| Dimethyl formamide—830 grams. |  |

Ethyl iodide, 0.083 weight percent based on the weight of polymer in the cement, was then added to a 30.3% total solids polymer solution. The initial Brookfield viscosity of the control was 31,300 cps. at 65° C., the final Brookfield viscosity was 15,700 cps., and the percent retention on heat aging was 49%. The sample containing ethyl iodide retained 81% of its original viscosity after 72 hours at 65° C.

Similar viscosity retention experiments were run for 137 days at 25° C. The control solution had a percent retention of only 17%, while a solution containing 0.33 weight percent ethyl iodide retained 100% of its original cement viscosity.

Example III

The method of Example I was employed using as a catalyst 0.0043 gram of potassium acetate. The catalyst was charged to the reactor before the diisocyanate addition and the polymerization continued for 105 minutes. The recipe used was:

| | Mol |
|---|---|
| Poly(tetramethylene adipate) glycol molecular weight=950; OH#=112.9; acid #2.6) | 0.1895 |
| 1,4-butanediol | 0.3790 |
| Diphenyl methane-4,4'-diisocyanate | 0.5774 |
| Dimethyl formamide—831 grams | |

Ethyl iodide, 0.33 weight percent based on the weight of polymer in the polymer cement, was added to one of two 30.3% total solids polymer solutions. After 72 hours at 65° C. the ethyl iodide containing sample retained 80% of its original viscosity. The Brookfield viscosity of the control was initially 58,000 cps. at 65° C. and dropped to 420° cps., a percent retention of only 8.6%. This represents approximately a ten-fold improvement for the ethyl iodide containing cement as compared with the control.

The above experiment was repeated using a 0.017 weight percent ethyl iodide solution. The control polymer solution had an original Brookfield viscosity of 38,400 cps., a final Brookfield viscosity of 7400 cps., and percent retention of 23%. The cement containing ethyl iodide retained 67% of its original viscosity.

When the above run was again repeated using a triethylene diamine catalyst and 0.33 weight percent normal propyl iodide, the test polymer solution retained 78% of its initial Brookfield viscosity. A control sample which had an original viscosity of 54,000 cps. and a final viscosity of 7000 cps., had a percent retention of only 17% after 72 hours at 65° C.

Example IV

About 1.00 mole of poly(tetramethylene adipate) glycol molecular weight 970, hydroxyl number 110.7, acid number 2.5, 2.00 moles of 1,4-butanediol and 3.00 moles of diphenyl-4,4'-diisocyanate were melt polymerized as described in U.S. Pat. 2,871,218. A 30.3% total solids cement was prepared using dimethyl formamide as the solvent. Ethyl iodide, 0.33% by weight based on the weight of polymer in the polyurethane solution, was added to 180 grams of 30.3% total solids polymer cement and compared with a control by heating it for 72 hours at 65° C. The sample which contained ethyl iodide retained 87% of its original viscosity, while the control polymer exhibited an original viscosity of 17,500 cps. at 65° C., a final viscosity of 8930 cps. and a percent retention of only 53%.

The above experiment was repeated using a 25% total solids solution in dimethyl acetamide. The ethyl iodide containing solution had a percent retention of 81.5% and the control sample only 47.8%.

Example V

Using the procedure outlined in Example I, poly (tetramethylene adipate) glycol, 1,4-butanediol and diphenyl-4,4'- diisocyanate, in a molar ratio of 1.00/2.00/3.06 were reacted in dimethyl formamide. To the polyurethane solutions formed, a number of halogen-containing compounds were added and tested as follows:

| Halogen-containing compound | Weight of additive,[1] percent | Percent retention, w/additive[2] | Percent retention, control[2] |
|---|---|---|---|
| n-Propyl iodide | 0.33 | 86.5 | 15.9 |
| n-Butyl bromide | 0.67 | 78.4 | 13.5 |
| | 0.083 | 69.0 | 19.0 |
| Allyl bromide | 0.33 | 80.0 | 16.0 |
| Carbon tetrabromide | 0.33 | 61.8 | 9.5 |

[1] Percent by weight of additive based on the total weight of polymer in the cement.
[2] 72 hours at 65° C.

Example VI

A solution polymerization was conducted as in Example I using the following recipe:

| | Mole |
|---|---|
| Poly(tetramethylene ether) glycol (molecular weight=1510; OH number=74; acid number 0.01) | 0.1586 |
| 1,4-butanediol | 0.6344 |
| Diphenyl methane -4,4'-diisocyanate | 0.8011 |
| Dimethyl formamide—1150 grams | |

Propyl iodide, 0.33 weight percent based on the weight of polymer in the solution, was added to each of two 180 gram samples of the 30.3% total solids polyether urethane cement. The control had an original Brookfield viscosity of 21,400 cps. at 65° C., a final viscosity after 72 hours at 65° C. of 5400 cps., and a percent retention of only 26%, while the solution containing ethyl iodide retained 97% of its original viscosity.

I claim:

1. Heat stable polyurethane solutions comprising (A) a polyurethane elastomer, (B) a solvent for said polyurethane and (C) from about 0.003 to 3.0 weight percent based on the weight of (A) of an aliphatic halogen-containing compound having the formula

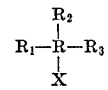

in which R is selected from the group consisting of saturated aliphatic hydrocarbons containing from 1 to 6 carbon atoms and aliphatic hydrocarbons containing from 2 to 6 carbon atoms and having a terminal double bond, $R_1$, $R_2$, $R_3$ each represents a member selected from the group consisting of hydrogen, halogen, and alkyl radicals containing from 1 to 4 carbon atoms, and X is a halogen.

2. The polyurethane solutions of claim 1 wherein (A) is an essentially linear thermoplastic polyurethane.

3. The polyurethane solutions of claim 2 wherein (A) is an essentially linear thermoplastic polyurethane elastomer comprising the reaction product of (1) a hydroxyl-terminated compound selected from the group consisting of hydroxyl-terminated polyesters, hydroxy poly(alkylene oxides), hydroxy polyacetals and (2) a free glycol chain extender with (3) an organic diisocyanate.

4. The polyurethane solutions of claim 3 wherein R is selected from the group consisting of saturated aliphatic hydrocarbons containing from 1 to 4 carbon atoms, aliphatic hydrocarbons containing from 2 to 4 carbon atoms and having a terminal double bond, $R_1$, $R_2$, and $R_3$ each represents a member selected from the group consisting of hydrogen, halogen radicals selected from the group consisting of chlorine, bromine and iodine, alkyl radicals containing from 1 to 2 carbon atoms, X is a halogen radical selected from the group consisting of chlorine, bromine and iodine, and (B) is an organic solvent selected from the group consisting of dimethyl formamide and dimethyl acetamide.

5. The polyurethane solutions of claim 4 wherein (A) comprises the reaction product of about one mole of (1) a hydroxyl-terminated compound, from about 0.1 to 10 moles of (2) a free glycol chain extender, from about 1.1 to 11 moles of (3) an organic diisocyanate, and (C) is from about 0.01 to 2.0 weight percent based on the weight of (A).

References Cited

UNITED STATES PATENTS

| | | | |
|---|---|---|---|
| 2,692,874 | 10/1954 | Langerak | 260—77.5 |
| 2,929,800 | 4/1960 | Hill, Jr. | 260—77.5 |
| 3,259,593 | 4/1968 | Eichhorn | 260—2.5 |
| 3,375,220 | 4/1968 | Clark et al. | 260—45.7 |
| 3,499,858 | 4/1970 | Strassel | 260—30.2 |

MORRIS LIEBMAN, Primary Examiner

R. ZAITLEN, Assistant Examiner

U.S. Cl. X.R.

260—45.7 R, 77.5